(12) United States Patent
Yamaguchi et al.

(10) Patent No.: US 11,320,811 B2
(45) Date of Patent: May 3, 2022

(54) PLANT OPERATING CONDITION SETTING SUPPORT SYSTEM, LEARNING DEVICE, AND OPERATING CONDITION SETTING SUPPORT DEVICE

(71) Applicant: CHIYODA CORPORATION, Yokohama (JP)

(72) Inventors: Yoshihiro Yamaguchi, Yokohama (JP); Takehito Yasui, Yokohama (JP); Toshiya Momose, Yokohama (JP)

(73) Assignee: CHIYODA CORPORATION, Kanagawa (JP)

( * ) Notice: Subject to any disclaimer, the term of this patent is extended or adjusted under 35 U.S.C. 154(b) by 0 days.

(21) Appl. No.: 16/995,031

(22) Filed: Aug. 17, 2020

(65) Prior Publication Data
US 2020/0379452 A1    Dec. 3, 2020

Related U.S. Application Data

(63) Continuation of application No. PCT/JP2018/005252, filed on Feb. 15, 2018.

(51) Int. Cl.
G05B 19/418      (2006.01)
G06N 20/00       (2019.01)

(52) U.S. Cl.
CPC ....... G05B 19/41865 (2013.01); G06N 20/00 (2019.01); G05B 2219/37591 (2013.01)

(58) Field of Classification Search
CPC .... G05B 19/41865; G05B 2219/37591; G06N 20/00
See application file for complete search history.

(56) References Cited

U.S. PATENT DOCUMENTS

2018/0233921 A1*  8/2018  Kangas ............... H02J 3/383
2018/0241764 A1*  8/2018  Nadolski ............ G06N 3/0481
(Continued)

FOREIGN PATENT DOCUMENTS

CN    107004060 A  *  8/2017  ....... H01L 21/67253
CN    107004060 A     8/2017
(Continued)

OTHER PUBLICATIONS

TIPO Office Action for corresponding TW Application No. 108105066; dated Dec. 22, 2020.
(Continued)

Primary Examiner — Raymond L Nimox
(74) Attorney, Agent, or Firm — Cantor Colburn LLP

(57) ABSTRACT

A plant operating condition setting support system for supporting the setting of a plant operating condition includes: a learning device that learns a regression model for calculating, from values of a plurality of state parameters indicating an operating condition of a plant and values of a plurality of manipulation parameters set to control an operation of the plant, a predicted value of an output indicating a result of operating the plant when the values of the plurality of manipulation parameters are set in the operating condition indicated by the values of the plurality of state parameters; and an operating condition setting support device that calculates the values of the plurality of manipulation parameters that should be set to control the operation of the plant, by using the regression model learned by the learning device.

4 Claims, 3 Drawing Sheets

(56) References Cited

U.S. PATENT DOCUMENTS

| | | | |
|---|---|---|---|
| 2019/0165966 A1* | 5/2019 | Gupta | G06Q 10/06 |
| 2019/0213484 A1* | 7/2019 | Winn | G06N 5/027 |
| 2019/0251707 A1* | 8/2019 | Gupta | G06T 9/002 |
| 2020/0015101 A1* | 1/2020 | Kucera | H04W 52/54 |
| 2020/0020178 A1* | 1/2020 | Frohner | G07C 3/00 |

FOREIGN PATENT DOCUMENTS

| | | |
|---|---|---|
| JP | H11325433 A | 11/1999 |
| JP | 2001242905 A | 9/2001 |
| JP | 2002091505 A | 3/2002 |
| RU | 2273874 C2 | 4/2006 |
| TW | 201702186 A | 1/2017 |
| TW | M539648 U | 4/2017 |
| WO | 2017154181 A1 | 9/2017 |

OTHER PUBLICATIONS

International Preliminary Report on Patentability dated Aug. 27, 2020 and Written Opinion of the International Searching Authority for International Application No. PCT/JP2018/005252; dated Apr. 24, 2018.

International Search Report for International Application No. PCT/JP2018/005252; dated Apr. 28, 2018.

GCC Examination Report for corresponding GCC Patent Application No. GC2019-37045; dated Jun. 27, 2021.

FIIP Office Action for corresponding Russian Patent Application No. 2020128158; dated Jul. 12, 2021.

FIIP Search Report for corresponding RU Application No. 2020128158/28: dated, Jul. 6, 2021.

TIPO Rejection Decision for corresponding TW Application No. 108105066; dated Dec. 8, 2021.

JPO Notification of Reasons for Refusal for corresponding JP Application No. 2019-571877; dated Nov. 24, 2021.

\* cited by examiner

PLANT OPERATING CONDITION SETTING SUPPORT SYSTEM, LEARNING DEVICE, AND OPERATING CONDITION SETTING SUPPORT DEVICE

CROSS REFERENCE TO RELATED APPLICATION

This application is a continuation under 35 U.S.C. § 120 of PCT/JP2018/005252 filed Feb. 15, 2018 which is incorporated herein by reference in its entirety.

BACKGROUND OF THE INVENTION

1. Field of the Invention

The present invention relates to a plant operating condition support system for supporting the setting of a plant operating condition and to a learning device and an operating condition setting support device that can be used in the plant operating condition setting support system.

2. Description of the Related Art

In plants for producing chemical products, industrial products, and the like, a series of processes are performed by a large number of devices such as a reactor and a heating furnace. A large number of manipulation parameters for controlling the large number of devices respectively define an operating condition. In plants in which a multistep process is performed, a large number of manipulation parameters can interact with each other in a complicated manner. It is therefore not easy to predict an impact from changing a manipulation parameter, and the manipulation parameters are set by an experienced operator to operate the plant.

Efforts have been made to build a simulation model to simulate a combination of a plurality of unit operations by combining process simulators that each simulates a process performed in a plant in response to a unit operation (see, for example, patent document 1).
[patent document 1] WO2017/154181

SUMMARY OF THE INVENTION

A simulation model is adjusted manually and requires a large number of man hours. On top of that, the precision of simulating an actual process is dependent on the experience or skill of a person responsible for the adjustment. There are also events that are difficult to be simulated by a process simulator. It has therefore been difficult to build a simulation model capable of simulating the operating condition of an actual plant accurately.

The present invention addresses the above issue and a purpose thereof is to provide a technology for supporting the setting of an operating condition capable of realizing the suitable operation of a plant.

A plant operating condition setting support system according to an embodiment of the present invention is for supporting the setting of a plant operating condition and includes: a learning device that learns a regression model for calculating, from values of a plurality of state parameters indicating an operating condition of a plant and values of a plurality of manipulation parameters set to control an operation of the plant, a predicted value of an output indicating a result of operating the plant when the values of the plurality of manipulation parameters are set in the operating condition indicated by the values of the plurality of state parameters; and an operating condition setting support device that calculates the values of the plurality of manipulation parameters that should be set to control the operation of the plant, by using the regression model learned by the learning device. The learning device includes: a recorded value acquisition unit that acquires a record of a combination including: the values of the plurality of state parameters; the values of the plurality of manipulation parameters; and a value of an output indicating a result of operating the plant when the values of the plurality of manipulation parameters are set in the operating condition indicated by the values of the plurality of state parameters; a learning unit that learns the regression model, based on a plurality of recorded values acquired by the recorded value acquisition unit; and a regression model provider that provides the regression model learned by the learning unit to the operating condition setting support device. The operating condition setting support device includes: a regression model acquisition unit that acquires the regression model learned by the learning device; a state parameter acquisition unit that acquires the values of the plurality of state parameters; a manipulation parameter calculation unit that uses the regression model to calculate the values of the plurality of manipulation parameters that make the value of the output satisfy a predetermined condition when the plant is operated in the operating condition indicated by the plurality of state parameters acquired by the state parameter acquisition unit; and a manipulation parameter output unit that outputs the values of the plurality of manipulation parameters calculated by the manipulation parameter calculation unit.

Another embodiment of the present invention relates to a learning device. The device includes: a recorded value acquisition unit that acquires a record of a combination including: values of a plurality of state parameters indicating an operating condition of a plant; values of a plurality of manipulation parameters set to control an operation of the plant; and a value of an output indicating a result of operating the plant when the values of the plurality of manipulation parameters are set in the operating condition indicated by the values of the plurality of state parameters; a learning unit that learns, based on a plurality of recorded values acquired by the recorded value acquisition unit, a regression model for calculating a predicted value of an output indicating a result of operating the plant when the values of the plurality of manipulation parameters are set in the operating condition indicated by the values of the plurality of state parameters; and a regression model provider that provides the regression model learned by the learning unit to an operating condition setting support device for calculating the values of the plurality of manipulation parameters that should be set to control the operation of the plant.

Still another embodiment of the present invention relates to an operating condition setting support device. The device includes: a regression model acquisition unit that acquires a regression model learned by a learning device which learns the regression model for calculating, from values of a plurality of state parameters indicating an operating condition of a plant and values of a plurality of manipulation parameters set to control an operation of the plant, a predicted value of an output indicating a result of operating the plant occurring when the plurality of manipulation parameters are set in the operating condition indicated by the plurality of state parameters; a state parameter acquisition unit that acquires the values of the plurality of state parameters indicating the operating condition of the plant; a manipulation parameter calculation unit that uses the regression model to calculate the values of the plurality of manipulation parameters that make a value of the output satisfy a predetermined condition when the plant is operated in the operating condition indicated by the plurality of state parameters acquired by the state parameter acquisition unit; and a manipulation parameter output unit that outputs the values of the plurality of manipulation parameters calculated by the manipulation parameter calculation unit.

Optional combinations of the aforementioned constituting elements, and implementations of the invention in the form of methods, apparatuses, systems, recording mediums, and computer programs may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
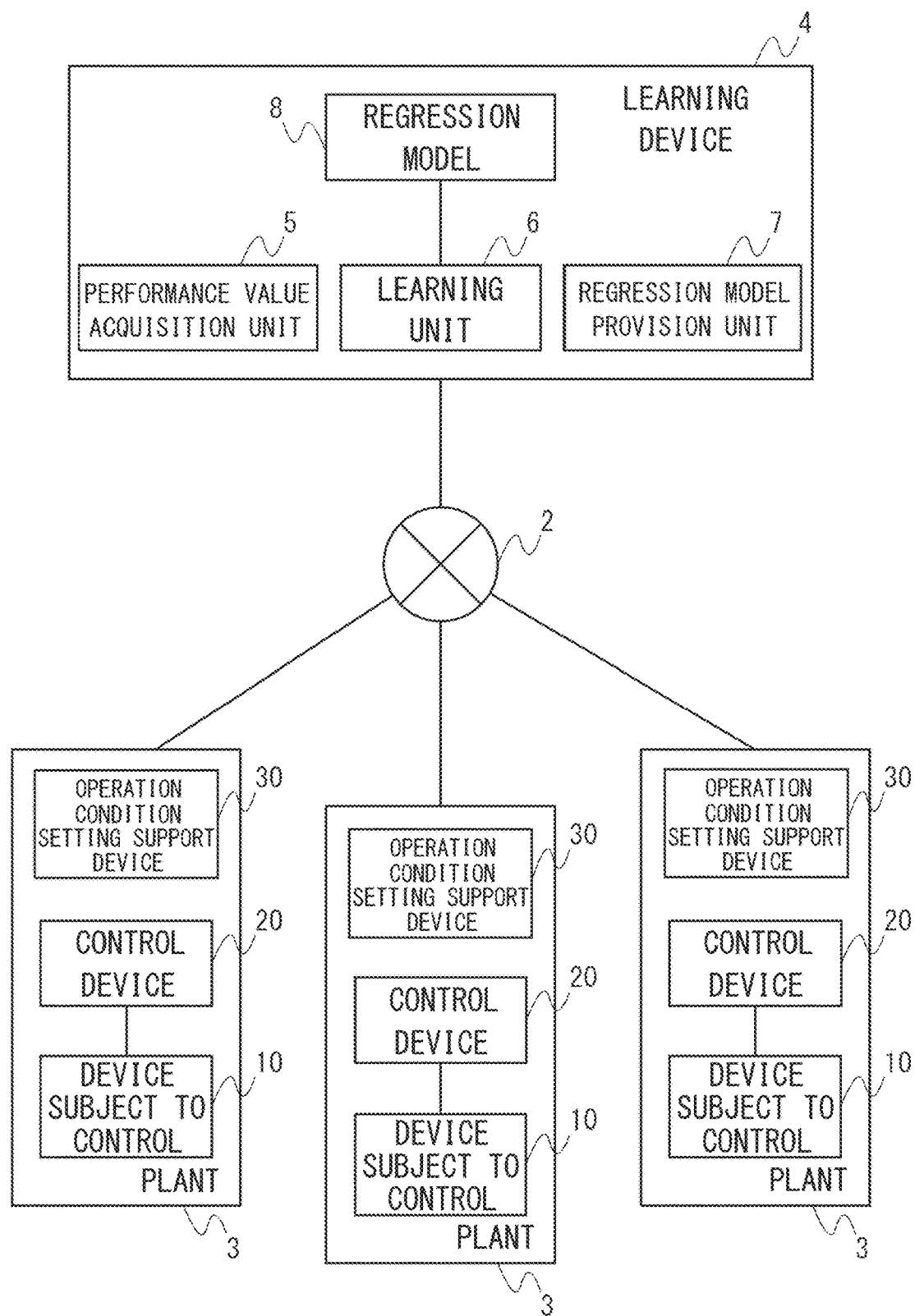
FIG. 1 shows an overall configuration of a plant operating condition setting support system according to an embodiment.

FIG. 1 shows an overall configuration of a plant operating condition setting support system according to an embodiment. A plant operating condition setting support system 1 for supporting the setting of an operating condition of a plant 3 is provided with a plant 3 for producing chemical products, industrial products, etc., and a learning device 4 that learns a regression model 8 for calculating, from values of a plurality of state parameters indicating an operating condition of the plant 3 and values of a plurality of manipulation parameters set to control the operation of the plant 3, a predicted value of an output indicating a result of operating the plant 3 occurring when the plurality of manipulation parameters are set in the operating condition indicated by the plurality of state parameters. Each plant 3 includes a device subject to control 10 such as a reactor and a heating furnace provided in the plant 3, a control device 20 for setting a manipulation parameter for controlling the operation of the device subject to control 10, and an operating condition setting support device 30 for calculating values of a plurality of manipulation parameters that should be set to control the operation of the plant 3, by using the regression model 8 learned by the learning device 4. The plants 3 and the learning device 4 are connected by the Internet 2.

The learning device 4 includes a recorded value acquisition unit 5, a learning unit 6, a regression model provider 7, and a regression model 8. The features are implemented in hardware components such as a CPU and a memory in an arbitrary computer, a program loaded into the memory, etc. The figure depicts functional blocks implemented by the cooperation of these elements. Therefore, it will be understood by those skilled in the art that the functional blocks may be implemented in a variety of manners by hardware only, software only, or by a combination of hardware and software.

The regression model 8 is a model for calculating, based on values of a plurality of state parameters indicating an operating condition of the plant 3 and values of a plurality of manipulation parameters set to control the operation of the plant 3, a predicted value of the output indicating a result of operating the plant 3 occurring when the plurality of manipulation parameters are set in the operating condition indicated by the values of the plurality of state parameters. In other words, the regression model 8 does not simulate individual processes performed in the plant 3 but calculates a predicted value of the output through computation using the values of the plurality of state parameters and the values of the plurality of manipulation parameters. The regression model 8 may calculate a predicted value of the output through computation using the values of the plurality of state parameters, the values of the plurality of manipulation parameters, and a computation parameter for computing a predicted value of the output.

The value of the output may be an arbitrary value indicating a result of operating the plant 3. For example, the value may be the quantity, quality (e.g. purity), yield, etc. of the product produced by the plant 3. Alternatively, the value may be the quantity, density, etc. of the byproduct or discharge gas, the time, energy, quantity/quality/temperature of the source material or supplied material required to produce the product, or the key performance indicator (KPI) indicating the production efficiency of the plant 3.

The recorded value acquisition unit 5 acquires, from the plant 3, a record of a combination including: values of a plurality of state parameters indicating an operating condition of the plant 3; values of a plurality of manipulation parameters set to control the operation of the plant 3; and a value of an output indicating a result of operating the plant 3 occurring when the values of the plurality of manipulation parameters are set in the operating condition indicated by the values of the plurality of state parameters.

The learning unit 6 learns (finds, fits, builds, develops, adjusts, improves, or optimizes) the regression model 8 based on a plurality of recorded values acquired by the recorded value acquisition unit 5. The learning unit 6 may adjust the value of the computation parameter such that, when the values of the plurality of state parameters and the values of the plurality of manipulation parameters acquired by the recorded value acquisition unit 5 are input to the regression model 8, a value close to the recorded value of the output combined with these values is calculated. The learning unit 6 may learn the regression model 8 according to a supervised learning model using the recorded value of the output of the plant 3 as training data or build knowledge in the regression model 8 by using other known arbitrary machine learning technologies.

By learning the regression model 8 by using a large number of recorded values, the precision of the regression model 8 is improved. It is thus possible to generate the regression model 8 capable of calculating a predicted value of the output indicating a result of operating the plant 3 more accurately. Further, there is no need to develop an advanced simulator for simulating a complicated process so that the time and load required to generate the regression model 8 are significantly reduced. Moreover, factors that are difficult to simulate in a simulator can be taken into account so that the predicted value of the output is calculated more accurately.

Different regression models 8 may be built for different plants 3. The regression model 8 common to a plurality of plants 3 may be built by using recorded values from a plurality of plants 3 performing processes of similar types.

The regression model provider 7 provides the regression model 8 learned by the learning unit 6 to the operating condition setting support device 30.

The figure shows the learning device 4 as a standalone device to simplify the illustration, but the learning device 4 may be implemented by a plurality of servers by using a cloud computing technology or a distributed processing technology. This enables building knowledge in the regression model 8 by processing a large volume of information collected from the plants 3 at a high speed so that the time required to improve the precision of the regression model 8 can be significantly reduced.

Figure 2:
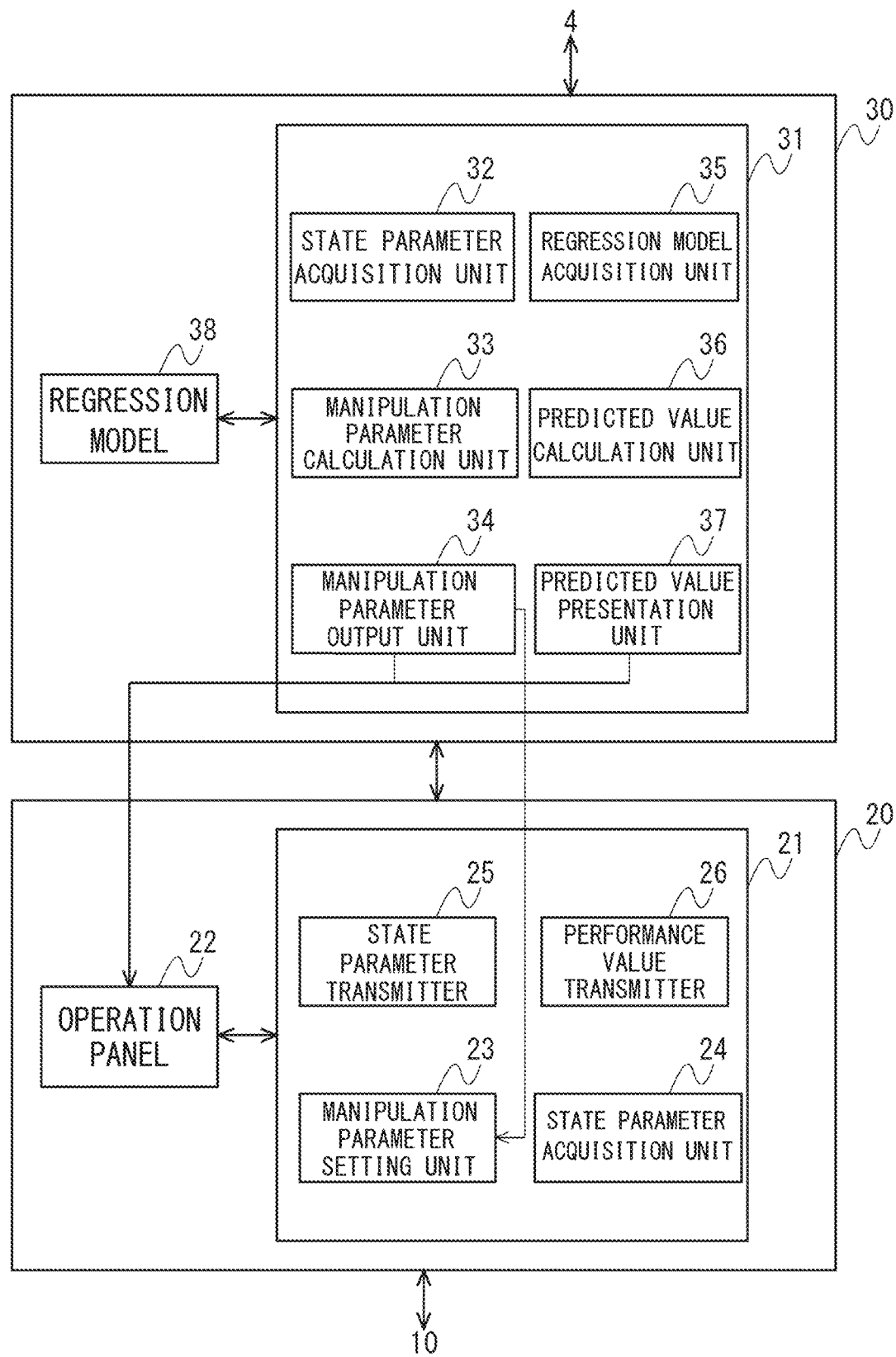
FIG. 2 shows a configuration of an operating condition setting support device and a control device according to the embodiment.

FIG. 2 shows a configuration of an operating condition setting support device and a control device according to the embodiment. The control device 20 includes a controller 21 and a operation panel 22.

The operation panel 22 displays values of various state parameters indicating an operating condition of the plant 3, values of various manipulation parameters set by the control device 20, and a value of an output indicating a result of operating the plant 3 and receives an input of values of various manipulation parameters from an operator.

The controller 21 includes a manipulation parameter setting unit 23, a state parameter acquisition unit 24, a state parameter transmitter 25, and a recorded value transmitter 26. These functional blocks may be implemented in a variety of manners by hardware only, software only, or by a combination of hardware and software.

The manipulation parameter setting unit 23 sets values of various manipulation parameters received via the operation panel 22 from an operator to control the device subject to control 10 and displays the values on the display device of the operation panel 22. The state parameter acquisition unit 24 acquires values of various state parameters indicating the operating condition and the result of operation of the plant 3 from various sensors and measuring instruments provided in the device subject to control 10 and displays the values on the display device of the operation panel 22. The state parameter transmitter 25 transmits the values of state parameters acquired from the state parameter acquisition unit 24 to the operating condition setting support device 30. The recorded value transmitter 26 transmits, to the learning device 4, the values of manipulation parameters set by the manipulation parameter setting unit 23 and the values of state parameters and value of the output acquired by the state parameter acquisition unit 24.

The operating condition setting support device 30 includes a controller 31 and a regression model 38.

The controller 31 includes a state parameter acquisition unit 32, a manipulation parameter calculation unit 33, a manipulation parameter output unit 34, a regression model acquisition unit 35, a predicted value calculation unit 36, and a predicted value presentation unit 37. These functional blocks may also be implemented in a variety of manners by hardware only, software only, or by a combination of hardware and software.

The regression model acquisition unit 35 acquires the regression model 8 learned by the learning device 4 and stores the acquired model in the storage device as a regression model 38. The state parameter acquisition unit 32 acquires the values of a plurality of state parameters from the state parameter transmitter 25 of the control device 20. The manipulation parameter calculation unit 33 uses the regression model 38 to calculate the values of the plurality of manipulation parameters that make the value of the output satisfy a predetermined condition when the plant 3 is operated in the operating condition indicated by the plurality of state parameters acquired by the state parameter acquisition unit 32. The manipulation parameter output unit 34 outputs the value of the plurality of manipulation parameters calculated by the manipulation parameter calculation unit 33 to the control device 20. The values of the manipulation parameters thus output may be presented on the operation panel 22 for the operator to refer to when the operator enters values of manipulation parameters manually or may be entered in the manipulation parameter setting unit 23 automatically.

By applying a solution algorithm for an optimization problem to the output value suitable for the purpose, the manipulation parameter calculation unit 33 calculates the values of the plurality of manipulation parameters capable of optimizing the value of the output. For example, where it is desired to determine an optimum operating set point capable of maximizing the efficiency of producing the final product, the manipulation parameter calculation unit 33 calculates, using a solution algorithm for an optimization problem, the values of the plurality of manipulation parameters that maximize the predicted value of KPI calculated when the plurality of state parameters acquired by the state parameter acquisition unit 32 are entered as fixed values and the values of the plurality of manipulation parameters are entered as variables in the regression model 8 for calculating the KPI indicating the production efficiency of the final product. A known arbitrary algorithm such as the gradient method, the Nelder-Mead method, or the like may be used as the solution algorithm for an optimization problem.

In the case of calculating the predicted value of KPI or the like by a simulator, a significant computation volume and time are required merely to calculate the value of KPI corresponding to a single combination including the values of the plurality of state parameters and the values of the plurality of manipulation parameters. It may therefore take a period of from several weeks to several months to calculate an enormous volume of predicted values of KPI over the entire range of possible values of all manipulation parameters and to search for the values of the plurality of manipulation parameters that maximize the predicted value of KPI. To reduce the period required for a search, it will be necessary to reduce the number of pairs for which the predicted values of KPI are calculated. As a result, the truly optimum operation set point may not be identified by a search. Further, in the case the process as a whole is simulated by combining process simulators that simulate individual steps, convergence to the optimum solution in the process as a whole may not be achieved even if the optimum solution is calculated for individual steps. Thus, it is not easy to change the operation set point of the plant 3 according to the related art. It had been difficult to change to the optimum operation set point even if the values of the plurality of manipulation parameters set in the plant 3 do not result in the optimum operation set point in the operating condition indicated by the concurrent plurality of state parameters.

By way of contrast, the technology of the embodiment enables obtaining a highly precise regression model 8 through machine learning. It is therefore possible to calculate a value of the output corresponding to a combination including the values of the plurality of state parameters and the values of the plurality of manipulation parameters efficiently and accurately. Accordingly, the values of the plurality of manipulation parameters that give the output value satisfying a predetermined condition can be identified by a search and output in a short period of time. It is therefore possible to set the optimum values of manipulation parameters in accordance with a change in the plurality of state parameters and to optimize the operation of the plant 3 accordingly. Further, the predicted value of the output corresponding to a combination including the values of the plurality of state parameters and the values of the plurality of manipulation parameters can be calculated in a short period of time. It is therefore possible to calculate the predicted values of the output for a larger number of combinations and identify the optimum operation set point by a search. This makes it possible to use any solution algorithm for an optimization problem to search for the maximum value or the minimum value over the entire range without being caught by local extremal values. Therefore, the true optimum solution can be calculated.

The predicted value calculation unit 36 calculates the predicted value of the output by substituting the plurality of state parameters and the plurality of manipulation parameters into the regression model 38. The predicted value presentation unit 37 presents the predicted value of the output calculated by the predicted value calculation unit 36 on the operation panel 22. For example, the predicted value presentation unit 37 may calculate and present the current value of the output such as KPI based on the current values of the state parameters acquired by the state parameter acquisition unit 32 and the set values of the plurality of manipulation parameters actually set by the manipulation parameter setting unit 23. Further, when a change in the state parameter caused by a change in the environment is predicted in the future, the predicted value presentation unit 37 may calculate and present the predicted value of the output in the future based on the post-change values of the state parameters and the currently set values of the manipulation parameters. When the operator is considering a change in the set values of the manipulation parameters, the predicted value presentation unit 27 may calculate and present the post-change predicted value of the output based on the current values of the state parameters and the post-change set values of the manipulation parameters. In this way, the setting of the operating condition by the operator is properly supported.

Figure 3:
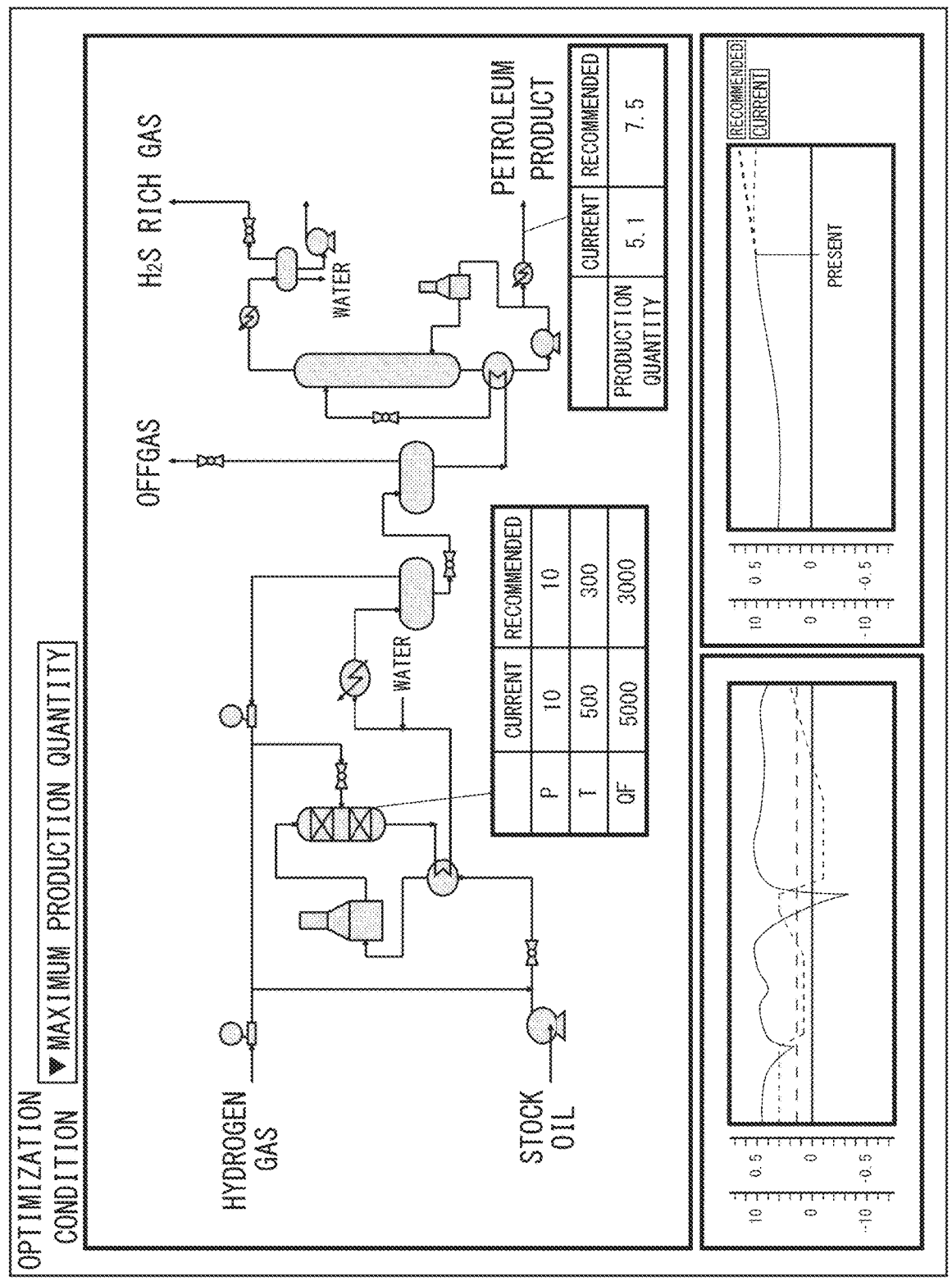
FIG. 3 shows an exemplary screen displayed on the display device of the operation panel.

FIG. 3 shows an exemplary screen displayed on the display device of the operation panel. The display screen shows a process flow diagram of the plant 3, the values of the state parameters related to the operating condition, the values of the state parameters related to the result of operation, and the set values of the plurality of manipulation parameters. When the operator sets a condition of the value of the output indicating the result of operating the plant 3, the manipulation parameter calculation unit 33 uses the regression model 38 to calculate the optimum values of the manipulation parameters that satisfy the condition. The manipulation parameter output unit 34 displays the values of the manipulation parameters thus calculated on the display screen. Further, the manipulation parameter output unit 34 displays, on the display device, a graph showing a time-dependent change of the values of the output indicating the result of operating the plant 3 occurring when a change is made to the values of the manipulation parameters thus calculated and when the change is not made. In outputting the value of the output on the display screen, the manipulation parameter output unit 34 may display the value in such a manner that it can be distinguished whether the value corresponds to the recorded value or the predicted value. The operator may refer to the values of the manipulation parameters presented so as to determine the set values of the manipulation parameters and enters the determined values in the operation panel 22. The manipulation parameter setting unit 23 controls the device subject to control 10 based on the set values thus entered.

The values of the manipulation parameters output by the manipulation parameter output unit 34 may be directly entered in the manipulation parameter setting unit 23 and automatically set in the device subject to control 10. In this case, the values of the manipulation parameters automatically set in the device subject to control 10 may or may not be presented on the operation panel 22. The operation may be switched between an automatic mode in which the values of the manipulation parameters output by the manipulation parameter output unit 34 are directly entered in the manipulation parameter setting unit 23 and a manual mode in which the values are not directly entered in the manipulation parameter setting unit 23 and presented on the operation panel 22 to allow the operator to manually enter the values of the manipulation parameters.

Described above is an explanation based on an exemplary embodiment. The embodiment is intended to be illustrative only and it will be understood by those skilled in the art that various modifications to constituting elements and processes could be developed and that such modifications are also within the scope of the present invention.

The technology of the present invention is equally applicable to a continuous process plant and a batch process plant.

According to this embodiment, it is possible to calculate and output the values of manipulation parameters capable of improving the value of the output indicating the result of operating the plant. Therefore, the manual or automatic setting of manipulation parameters is properly supported, and the operating efficiency of the plant is improved. The embodiment can also support the setting of the operating condition of the plant properly without being dependent on the experience of skill of the operator.

According to this embodiment, it is possible to calculate the values of the plurality of manipulation parameters capable of optimizing the value of the output of the plant efficiently and accurately so that the setting of an operating condition of the plant suitable for the purpose is supported.

According to this embodiment, it is possible to calculate a predicted value of the output indicating the result of operating the plant more efficiently and accurately. The embodiment can also generate a highly realistic regression model in which factors that are difficult to simulate by a process simulator are taken into account.

According to this embodiment, it is possible to calculate and output the values of manipulation parameters capable of improving the value of the output indicating the result of operating the plant. Therefore, the manual or automatic setting of manipulation parameters is properly supported, and the operating efficiency of the plant is improved. The embodiment can also support the setting of the operating condition of the plant properly without being dependent on the experience of skill of the operator.

According to the present invention, it is possible to provide a technology for supporting the setting of an operating condition capable of realizing a suitable operation of a plant.

What is claimed is:

1. A plant operating condition setting support system for supporting the setting of a plant operating condition, comprising:
   a learning device that learns a regression model, the regression model being provided to calculate, from values of a plurality of state parameters indicating an operating condition of a plant and values of a plurality of manipulation parameters set to control an operation of the plant, a predicted value of an output indicating a result of operating the plant when the values of the plurality of manipulation parameters are set in the operating condition indicated by the values of the plurality of state parameters; and an operating condition setting support device that calculates the values of the plurality of manipulation parameters that should be set to control the operation of the plant, by using the regression model learned by the learning device, wherein the learning device includes:
- a recorded value acquisition unit that acquires a record of a combination including: the values of the plurality of state parameters; the values of the plurality of manipulation parameters; and a value of an output indicating a result of operating the plant when the values of the plurality of manipulation parameters are set in the operating condition indicated by the values of the plurality of state parameters;
- a learning unit that learns the regression model, based on a plurality of recorded values acquired by the recorded value acquisition unit; and
- a regression model provider that provides the regression model learned by the learning unit to the operating condition setting support device, wherein the operating condition setting support device includes:
- a regression model acquisition unit that acquires the regression model learned by the learning device;
- a state parameter acquisition unit that acquires the values of the plurality of state parameters;
- a manipulation parameter calculation unit that identifies, by a search, the values of the plurality of manipulation parameters that make the value of the output satisfy a predetermined condition by using the regression model to calculate the value of the output occurring when a plurality of different values are set as the plurality of manipulation parameters, when the plant is operated in the operating condition indicated by the plurality of state parameters acquired by the state parameter acquisition unit; and
- a manipulation parameter output unit that outputs the values of the plurality of manipulation parameters identified by the search by the manipulation parameter calculation unit.

2. The plant operation condition setting support system according to claim 1, wherein
the manipulation parameter calculation unit identifies, by the search, the values of the plurality of manipulation parameters by applying a solution algorithm for an optimization problem to the value of the output.

3. A learning device comprising:
a recorded value acquisition unit that acquires a record of a combination including: values of a plurality of state parameters indicating an operating condition of a plant; values of a plurality of manipulation parameters set to control an operation of the plant; and a value of an output indicating a result of operating the plant when the values of the plurality of manipulation parameters are set in the operating condition indicated by the values of the plurality of state parameters;

a learning unit that learns, based on a plurality of recorded values acquired by the recorded value acquisition unit, a regression model for calculating a predicted value of an output indicating a result of operating the plant when the values of the plurality of manipulation parameters are set in the operating condition indicated by the values of the plurality of state parameters; and a regression model provider that provides the regression model learned by the learning unit to an operating condition setting support device for identifying, by a search, the values of the plurality of manipulation parameters that make the value of the output satisfy a predetermined condition by using the regression model to calculate the value of the output occurring when a plurality of different values are set as the plurality of manipulation parameters.

4. An operating condition setting support device comprising:
a regression model acquisition unit that acquires a regression model learned by a learning device which learns the regression model for calculating, from values of a plurality of state parameters indicating an operating condition of a plant and values of a plurality of manipulation parameters set to control an operation of the plant, a predicted value of an output indicating a result of operating the plant occurring when the plurality of manipulation parameters are set in the operating condition indicated by the plurality of state parameters;

a state parameter acquisition unit that acquires the values of the plurality of state parameters indicating the operating condition of the plant;

a manipulation parameter calculation unit that identifies, by a search, the values of the plurality of manipulation parameters that make a value of the output satisfy a predetermined condition by using the regression model to calculate the value of the output occurring when a plurality of different values are set as the plurality of manipulation parameters, when the plant is operated in the operating condition indicated by the plurality of state parameters acquired by the state parameter acquisition unit; and a manipulation parameter output unit that outputs the values of the plurality of manipulation parameters identified by the search by the manipulation parameter calculation unit.

* * * * *